Sept. 25, 1928.
B. R. BENJAMIN
CULTIVATOR BLADE
Filed Oct. 25, 1926
1,685,268
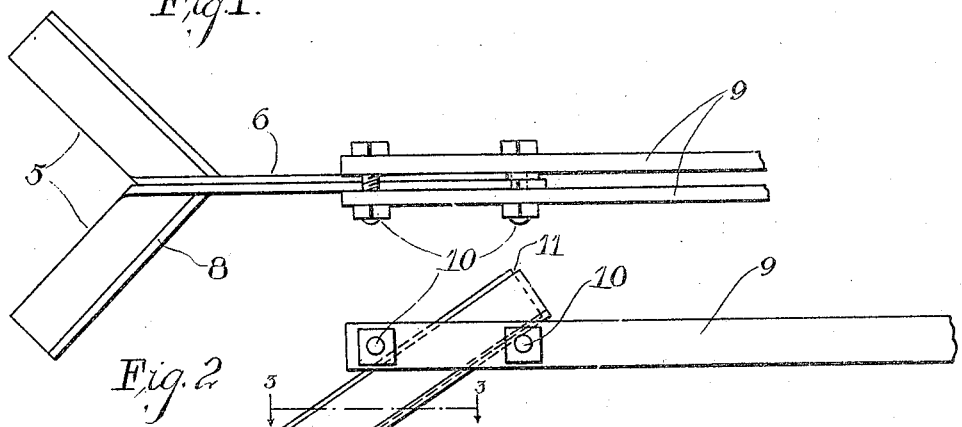
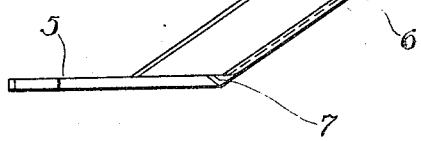
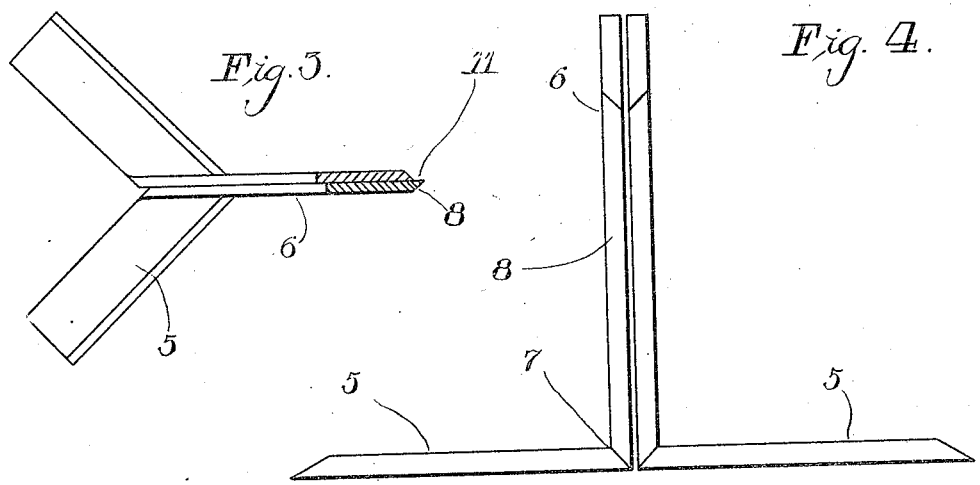
Inventor.
Bert R. Benjamin.
By H.P. Doolittle
Atty.

Patented Sept. 25, 1928.

1,685,268

UNITED STATES PATENT OFFICE.

BERT R. BENJAMIN, OF OAK PARK, ILLINOIS, ASSIGNOR TO INTERNATIONAL HARVESTER COMPANY, A CORPORATION OF NEW JERSEY.

CULTIVATOR BLADE.

Application filed October 25, 1926. Serial No. 143,846.

This invention relates to tillage tools and more particularly to a cultivator blade or sweep for use in cultivation of row crops or as a weeding tool.

The principal object of the invention is to provide a form of cultivating blade which will be simple and economical and so mounted as to be gaged automatically for proper depth of operation in the soil.

Another object is to provide a blade construction which will afford a plurality of sharpened edges any one of which may be presented to the soil, thereby making the blade effective for a prolonged period.

These and other minor objects, which will become apparent as the description proceeds, are attained by a structure comprising a blade formed in twin sections having contacting parts constituting a shank and opposite outwardly extending, angularly related end portions or sweeps, the sections being sharpened at their forward edges and so mounted as to permit either one to be selectively offset or advanced with respect to the other to present its cutting edge to the soil.

Referring to the drawing,—

Figure 1 is a plan view of a blade and portion of a dragbar embodying the invention;

Figure 2 is a similar side elevation;

Figure 3 is a sectional view on the line 3—3 of Figure 2; and

Figure 4 is an enlarged front view of the twin sections forming the blade, with the sections slightly separated for clearer illustration.

In the present embodiment of the invention, each of the twin blade sections forming the complete tool consists of a flat metal strip having an end portion 5 which is bent or extended at right angles to an upper or main portion 6 on an oblique transverse line as at 7. By so bending or extending the end of the blade, there is obtained a lateral extension which inclines backwardly and outwardly, in the direction of its length, from the axis of the upper or shank portion 6 when the blade sections are assembled and mounted in operating position. Each blade section is beveled throughout its length, as at 8, to present a forward cutting edge. Each assembled blade comprises right and left complemental sections which, when clamped together, will afford an upright shank with oppositely extending wings at its lower end, as clearly shown on the drawing.

The sections described are assembled and mounted in a novel manner on the end of a dragbar comprising parallel horizontal bars 9 between which the upper ends of the shank portions 6 of the blade sections are received and clamped by a suitable means such as front and rear transverse bolts 10. In assembling the blades, one section is set forward of the other, as shown at 11 (Figure 3), thereby affording a single sharp cutting edge throughout the effective length of the shank. When this edge has become dulled, the clamp bolts may be loosened and the opposite blade section similarly advanced, thereby presenting a new sharp edge. This method of assembly greatly prolongs the effective life of the tool. Extension of the end portions 5 of the blade sections from an oblique line, as described, affords a blade or sweep particularly designed for mounting in the position illustrated in Figure 2, that is, with the shank portion inclined downwardly and rearwardly and the end portions extended outwardly and rearwardly in a horizontal plane, thereby giving a shearing cut throughout the length of the entire blade when drawn through the soil. The horizontal position of the dragbar 9 causes it to act as a depth gauge, as the bars will ride on the surface of the soil and thus limit the penetration of the blade in accordance with the point of engagement of the dragbar with the blade shank.

The disclosure herein made exemplifies the preferred form of the invention, but certain modifications are obviously possible without departing from the scope of the invention as defined in the following claims.

What is claimed is:

1. An earth working tool comprising a pair of contacting flat blades, the respective blades having oppositely beveled forward edges arranged in offset relation and end portions which are oppositely extended laterally at right angles, and dragbars clamped on the upper ends of the blades.

2. An earth working tool comprising twin blades having flat upwardly and forwardly extending shank portions arranged in contact and opposite, laterally extending end portions which incline backwardly and outwardly from the shank portions, the respective blades having forward edges which are oppositely beveled throughout the length thereof the forward edge of one blade being advanced beyond the other.

3. An earth working tool comprising a pair of contacting flat blades, the respective blades having oppositely beveled forward edges and end portions which are oppositely extended laterally at right angles, and means for holding the contacting portions of said blades with the edge of one blade advanced with respect to the other.

In testimony whereof I affix my signature.

BERT R. BENJAMIN.